United States Patent

Wells et al.

[11] 4,425,817
[45] Jan. 17, 1984

[54] LUBRICATION SYSTEM FOR A POWER TAKE OFF ASSEMBLY AND A DRIVE SHAFT THEREFOR

[75] Inventors: Calvin G. Wells, Warren; Joseph L. Malkowski, Troy, both of Mich.

[73] Assignee: Rockwell International Corporation, Pittsburgh, Pa.

[21] Appl. No.: 244,178

[22] Filed: Mar. 16, 1981

[51] Int. Cl.³ .................. F16H 57/04; F16H 37/00
[52] U.S. Cl. .................................. 74/467; 74/15.6; 184/6.12
[58] Field of Search .............. 74/15.6, 467, 15.8, 74/15.82, 15.84, 15.86, 15.63, 15.66; 184/6.12

[56] References Cited

U.S. PATENT DOCUMENTS

| | | | |
|---|---|---|---|
| 2,459,092 | 1/1949 | Peterson et al. | 74/15.86 |
| 2,589,880 | 3/1952 | Sheppard | 74/15.6 |
| 2,711,100 | 6/1955 | Tharpe et al. | 74/15.66 |
| 3,065,822 | 11/1962 | McAfee et al. | 184/6.12 |
| 3,112,655 | 12/1963 | Hobbs et al. | 74/421 |
| 3,367,210 | 2/1968 | Scott | 74/421 A X |
| 4,368,802 | 1/1983 | Grabill et al. | 184/6.12 |

FOREIGN PATENT DOCUMENTS 1959585 7/1978 Fed. Rep. of Germany ........ 74/467

*Primary Examiner*—Lawrence J. Staab
*Assistant Examiner*—Michael D. Bednarek

[57] ABSTRACT

A lubrication system is for a power take off assembly and a drive shaft therefor. The drive shaft is mounted for rotation within a housing having a lubricating oil sump and is hollow to include lubricating supply passages therein. The power take off assembly includes a casing sealingly secured to the housing about an opening which provides access to the open end of the hollow drive shaft. Within the casing is a take off shaft which is coaxially aligned with the drive shaft and a device for selectively coupling the take off shaft to the drive shaft. The lubrication system includes a pump which is driven by a gear rigidly secured to the end of the drive shaft and provides lubricating oil from the sump to the end of the power take off assembly casing remote from the housing. Lubricating oil passes through the interior of the power take off casing to the end of the drive shaft to provide lubricating oil therefor.

2 Claims, 2 Drawing Figures

LUBRICATION SYSTEM FOR A POWER TAKE OFF ASSEMBLY AND A DRIVE SHAFT THEREFOR

BACKGROUND OF THE INVENTION

1. Field of the Invention

This invention relates to a lubrication system for a power take off assembly and a drive shaft therefor and, more specifically, to such a lubrication system which will operate independently of the coupling or uncoupling of a power take off assembly.

2. Description of the Prior Art

There are a number of multi-drive vehicles which utilize a main transmission and a transfer case which is capable of providing power to the rear axle alone or to both the front and rear axles at the same time. Typical transfer cases of this type are disclosed in U.S. Pat. Nos. 3,095,758; 3,557,634 and 3,679,016.

It is not uncommon in transfer cases to include a means for providing a multi-speed power transmission function in the form of high and low speed operations. Transfer cases such as those disclosed in U.S. Pat. Nos. 3,941,199 and 4,188,838 include such features and significantly increase the selective operating gear ratios which are available to the operator of a vehicle which uses a main transmission in conjunction with the transfer case.

However, in transmission devices of this type lubrication is often provided by the splashing of lubricating oil around the interior of the housing. The oil may be caught in channels or trays to be supplied to specific shaft bearing by gravity flow. However, in some configurations, where gears or other elements may be mounted for relative rotation on shafts which, in turn, rotate, the ineffectiveness of splash or gravity lubrication becomes apparent because of the many restricted locations needing lubricating oil. If the shafts are mounted in an upper region of the transmission device housing remote from the oil pump, the reliability of this type of lubrication system is further reduced.

To alleviate some of these problems, a Pressurized Lubrication System as disclosed in U.S. Patent Application Ser. No. 165,800 filed by Joseph L. Malkowski and Calvin G. Wells on Aug. 3, 1980 and issued on Jan. 18, 1983 as U.S. Pat. No. 4,368,802 has been introduced to provide lubricating oil to a plurality of elements mounted on the rotatable shaft of a transfer case. For this pressurized system to properly operate, the oil pump was mounted at the end of the shaft to be directly driven thereby. However, it is sometimes desirable to include a power take off assembly for the transfer case which can be mounted directly to the housing in alignment with the input shaft which specifically needs this type of pressurized lubrication system. Additionally, the power take off assembly needs lubrication for the rotating elements mounted herein and the splash or gravity types of lubrication systems mentioned hereinabove have been found to be generally unsatisfactory because the power take off assemblies are generally mounted on the housing in a region thereof remote from the oil sump.

SUMMARY OF THE INVENTION

It is, therefore, an object of this invention to provide a lubrication system for a power take off assembly and the drive shaft therefor.

It is another object of this invention to provide such a lubrication system which will operate independently of any means for selectively coupling the power take off assembly to the drive shaft so that it also may provide lubrication to the drive shaft and any elements mounted rotatably thereon.

These and other objects of the invention are provided in a preferred embodiment thereof in the form of a lubrication system for a power take off assembly and a drive shaft therefor wherein the drive shaft is mounted for rotation within a housing and has an end thereof aligned with an opening in the housing. The drive shaft has a central bore open at the end and includes radial passages extending from the central bore to be capable of providing lubricating oil to a plurality of elements mounted on the drive shaft. The housing has a supply of lubricating oil in a sump thereof. The power take off assembly includes a casing sealingly secured about the opening in the housing, a take off shaft coaxially aligned with the drive shaft and a means for selectively coupling the take off shaft to the drive shaft for rotation therewith. The lubrication system includes a driving gear rigidly secured to the end of the drive shaft. An oil pump is mounted on the casing and has a pump shaft extending into the casing. A driven gear is fixedly secured to the pump shaft within the casing and engages the driving gear for rotation in response to rotation of the drive shaft. There is piping to supply lubricating oil from the sump to the pump and to discharge lubricating oil from the pump to an end of the casing remote from the housing. The casing is sealed to allow the lubricating oil to be delivered by the pump to the bearings of the power take off shaft, the means for selectively coupling and the central bore of the drive shaft through the end thereof during rotation of the drive shaft.

DESCRIPTION OF THE PREFERRED EMBODIMENT

Figure 1:
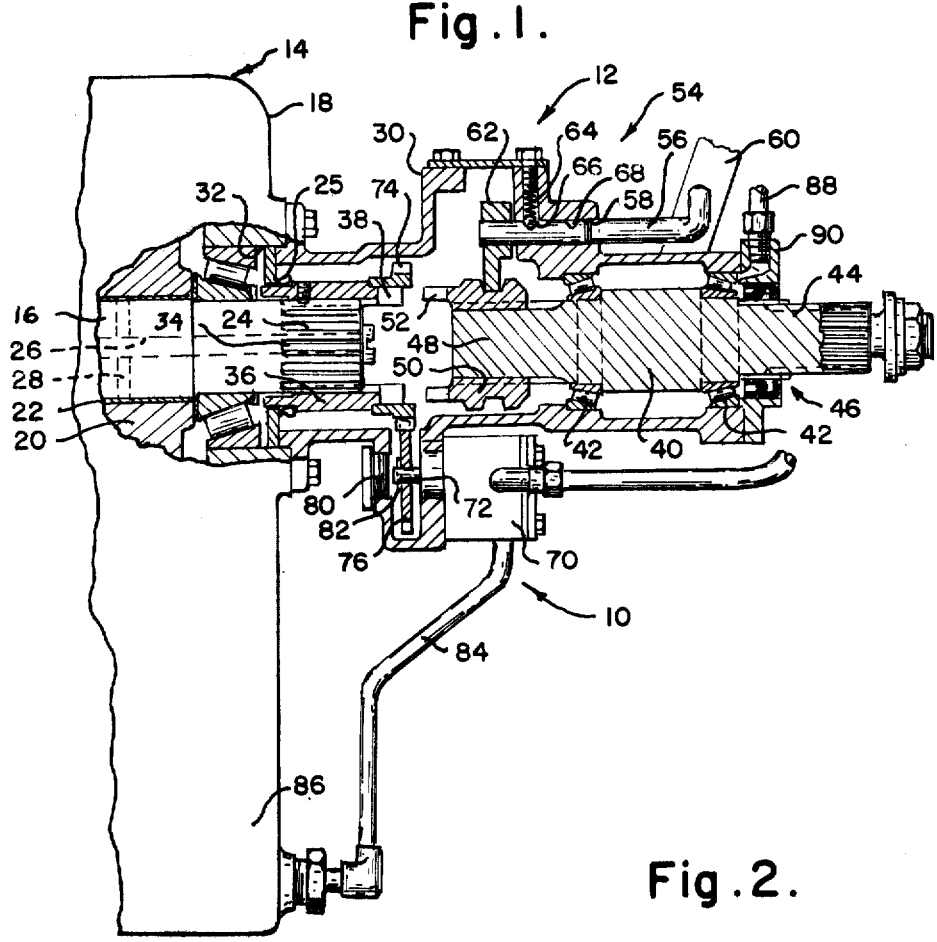
FIG. 1 is a fragmentary, sectional side view of the preferred embodiment of the invention including the power take off assembly as it is mounted on the housing of a preferred transfer case.
Figure 2:
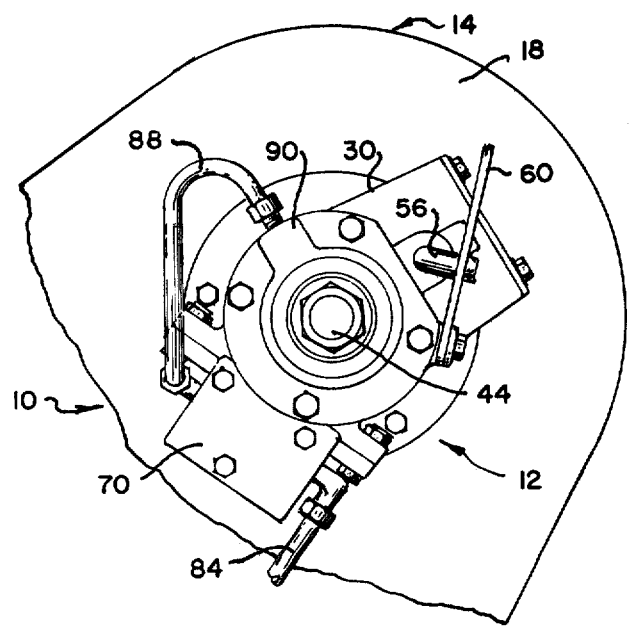
FIG. 2 is a fragmentary end view of the power take off assembly looking forwardly including various features of the invention.

As seen in FIGS. 1 and 2, the preferred lubrication system 10 is to be utilized with a power take off assembly 12 which is mounted on a transfer case 14 of the type described in U.S. Patent Application Ser. No. 4,368,802 referred to hereinabove. Specifically, the transfer case 14 includes an input shaft 16 which has a number of rotatable elements mounted thereon for providing selective high or low speed operation of a rearwardly extending output shaft (not shown). The input shaft 16 for the transfer case 14 is mounted for rotation within the transfer case housing 18 and is driven by an input coupling (not shown) at the forward end thereof which is coupled to the vehicle transmission (not shown). In addition to a high speed gear 20 having a sleeve bearing 22, there is also a low speed gear and sleeve bearing (not shown) and a shift mechanism utilizing a synchronizer (not shown) mounted on the input shaft 16 to provide for the selective high or low speed operation. As explained in the above mentioned application, these elements are all located in the upper region of the transfer case housing 18 and a positive lubrication system is needed to insure their effective operation throughout the life of the transfer case 14. For this purpose, a pump was mounted on the housing 18 to be aligned with the rear end 24 of the input shaft 16 and directly coupled thereto to provide lubricating oil under pressure to the end 24 of the shaft 16 which was isolated from the remaining interior of the housing 18 by a circumferential seal 25. A central bore 26 was opened at the end 24 and included radial passages 28 extending therefrom to provide the lubricating oil to the elements mounted on the shaft 16. Therefore, when the shaft 16 was rotated, the pump would provide lubricating oil under pressure to the end 24 of the shaft 16 and then to the elements through the central bore 26.

However, as seen in FIGS. 1 and 2, the use of a power take off assembly 12 prevents the direct installation of such a pump at the end 24 of the shaft 16. In such an installation, it is desirable for the shaft 16 to not only transmit power to other shafts within the transfer case but to also be capable of being directly coupled to the power take off assembly 12 for its selective operation.

For this purpose, the power take off assembly 12 is installed within a casing 30 which is mounted to the housing 18 about a hole 32 therein through which the end 24 of the shaft 16 extends. The shaft 16, which can now be considered a drive shaft for the power take off assembly 12, includes a splined region 34 at its end 24 to be capable of receiving a sleeve member 36 having internal splines thereon. The sleeve member 36 has axially extending dog teeth 38 which, as will be explained hereinbelow, will enable the drive shaft 16 to be operably coupled to the power take off assembly 12.

The power take off assembly includes a take off shaft 40 which is mounted at bearings 42 within the casing 30 in alignment with the input shaft 16. A splined rear end 44 of the take off shaft 40 extends through a sealed opening 46 at the rear of the power take off casing 30 to be capable of being joined to an element to be driven by the power take off assembly 12. The forward end 48 of the take off shaft 40 is also splined and includes a dog clutch 50 mounted thereon having axially extending dog teeth 52 which are capable of mating with the dog teeth 38 of the sleeve 36 mounted on the drive shaft 16.

To facilitate axial positioning of the dog clutch 50 and produce the coupling with the drive shaft 16, a shift mechanism 54 includes a shift rod 56 which extends through a hole 58 in the casing 30. The shift rod 56 is operated by a lever device 60 and can be selectively positioned in either of two positions to cause a fork member 62 mounted on the internal end thereof to operate on the dog clutch 50 to determine its position relative to the take off shaft 40. As shown in FIG. 1, the shift rod 56 is in the rearward position to position the fork 62 in a rearward position holding the dog clutch 50 axially away from the dog teeth 38 for disengagement. A spring and ball device 64 operates on a detent 66 in the shift rod 56 to prevent unintentional movement of the shift rod 56 toward an engaging position. To couple the power take off shaft 40 to the drive shaft 16, the shift linkage 60 is moved forwardly, to the left in FIG. 1, to cause the shift rod 56 to move forwardly. Overcoming the resistance of the ball and spring device 64, the shift rod 56 will act through the fork 62 to axially position the clutch 50 in an engaged position with the dog teeth 38. When the engaged position is obtained, the ball and spring device 64 will be received within a detent 68 to resist disengagement until disengagement is specifically desired.

As thus explained, the power take off assembly 12 is sealingly mounted to the housing 18 and includes elements in the interior thereof which require lubrication for their effective operation throughout the life of the power take off assembly. Additionally, the use of the power take off assembly 12 has eliminated the utilization of a pump directly coupled to the end 24 of the shaft 16 so that there is now needed a means for lubricating the elements mounted on the shaft 16. For this purpose, an oil pump 70 is mounted on the casing 30 and includes a shaft 72 extending therefrom to be located within the interior of the casing 30. To produce rotation of the shaft 72, a driving gear 74 is mounted about the circumferential outer surface of the sleeve 36 to include a plurality of teeth thereon which are aligned with and capable of engaging the teeth of a driven gear 76 which is mounted on the shaft 72.

To facilitate installation of the pump 70, an access opening 80 is provided in alignment with the shaft 72 which allows the pump 70 to be installed on the casing 30 after the gear 76 has been loosely positioned within the casing 30. The opening 80 allows the shaft 72 to be aligned with a keyed opening in the gear 76 and a clip 82 to be installed on the end of the shaft 72 to prevent axial displacement of the gear 76. After the gear 76 is so mounted on the shaft 72 the cover for the access opening 80 is reinstalled to seal this region of the casing 30.

The oil pump 70 includes a supply side thereof which takes lubricating oil through supply piping 84 from an oil sump 86 within the transfer case housing 18. The discharge of the pump 70 includes a discharge piping 88 which provides lubricating oil to a fitting 90 at the rear end of the power take off casing 30. Accordingly, any rotation of the drive shaft 16 will produce rotation of the pump 70 to cause hydraulic lubricating oil to be delivered from the sump 86 to the end of the power take off assembly 12 remote from the housing 18.

As lubricating oil enters the interior of the casing 30, it provides lubrication to the bearings 42 and the shift mechanism elements including the dog clutch 50. Because of the seal 25 at the end 24 of the shaft 16, the only outlet for lubricating oil from the interior of the casing 30 is the central passage 26 of the shaft 16 as lubricating oil enters its open end at the end 24 of the shaft 16. Lubricating oil under pressure can then be provided to the various elements mounted on the shaft 16 to insure that they will be properly lubricated throughout the operation of the transfer case 14. General leakage around the bearings and other elements mounted on the shaft 16 will cause the lubricating oil to be again collected in the sump 86 to insure a continuous supply of lubricating oil for the pump 70.

As thus explained, the preferred lubrication system 10 will provide lubricating oil under pressure to the shaft 16 whenever it rotates whether the power take off assembly is being utilized or not. Additionally, the lubricating oil is provided to the various elements associated with the power take off assembly 12 throughout rotation of the shaft 16 to insure that they will properly function whenever power take off operation is desired. Although the embodiment shown in FIGS. 1 and 2 represents the preferred embodiment of the invention, it should be clear that any number of alterations may be made without departing from the invention as claimed.

We claim:

1. A lubrication system for a power take off assembly and a drive shaft therefore; said drive shaft being mounted for rotation within a housing and having an end thereof aligned with an opening in said housing; said drive shaft having a central bore open at said end and including radial passages extending from said central bore to be capable of providing lubricating oil to a plurality of elements mounted on said drive shaft; said housing having a supply of lubricating oil in a sump thereof; said powr take off assembly including a casing sealingly secured about said opening in said housing, a take off shaft coaxially aligned with said drive shaft and mounted on bearings for rotation within said casing, and means for selectively coupling said take off shaft to said drive shaft for rotation therewith; said lubrication system comprising:

- a tubular sleeve secured to said end of said shaft and having a first end adjacent said take off shaft and a second end remote therefrom;
- said means for selectively coupling including a plurality of fixed, axially extending dog teeth on said first end of said tubular sleeve;
- said tubular sleeve having a plurality of radially extending teeth about a cylindrical extending region of said first end thereof to provide a driving gear;
- an oil pump mounted on said casing and having a pump shaft extending into said casing;
- a driven gear fixedly secured to said pump shaft within said casing and engaging said driving gear for rotation in response to rotation of said drive shaft;
- lubricating oil supply piping from said sump to said pump;
- lubricating oil discharge piping from said pump to an end of said casing remote from said housing;
- means for sealing said casing to allow said lubricating oil to be delivered by said pump to said bearings, said means for selectively coupling and said central bore of said drive shaft through said end thereof during rotation of said drive shaft; and
- said means for sealing including a circumferential seal between said housing and a cylindrical extending surface of said second end of said tubular sleeve to insure said lubricating oil will only be returned to said housing and said sump thereof through said central bore of said drive shaft.

2. The lubrication system as set forth in claim 1, further including a sealable access port in said casing aligned with said driven gear to allow access thereto for securing said driven gear on said pump shaft when said oil pump is being mounted on said casing.

* * * * *